United States Patent [19]

Borodin

[11] 4,178,662
[45] Dec. 18, 1979

[54] SPARK PLUG CONVEYOR AND ASSEMBLING MEANS

[75] Inventor: Daniel J. Borodin, Detroit, Mich.

[73] Assignee: U.S. Automation Company, Warren, Mich.

[21] Appl. No.: 912,192

[22] Filed: Jun. 5, 1978

[51] Int. Cl.² .................. B65G 51/02; H01J 21/02
[52] U.S. Cl. ................................ 29/25.2; 29/25.12; 406/21; 406/84
[58] Field of Search ............. 302/2 R, 11, 12, 23–25; 243/2, 3, 19, 38; 29/25.19, 25.2, 25.12

[56] References Cited

U.S. PATENT DOCUMENTS

| | | | |
|---|---|---|---|
| 1,234,281 | 7/1917 | Burton | 243/19 |
| 2,072,087 | 3/1937 | Dewar | 29/25.19 |
| 2,106,451 | 1/1938 | Brown | 29/25.19 |
| 2,272,882 | 2/1942 | Brown | 29/25.19 |
| 2,908,066 | 10/1959 | Featherstone et al. | 29/25.12 |
| 3,198,581 | 8/1965 | Gamberini | 302/2 R |

FOREIGN PATENT DOCUMENTS

| | | | |
|---|---|---|---|
| 1916784 | 10/1969 | Fed. Rep. of Germany | 243/2 |
| 1812512 | 6/1970 | Fed. Rep. of Germany | 243/19 |
| 1200392 | 12/1959 | France | 302/2 R |

Primary Examiner—John McQuade
Attorney, Agent, or Firm—Barnes, Kisselle, Raisch & Choate

[57] ABSTRACT

A pneumatic conveyor for transporting and locating a series of spark plug insulator and electrode assemblies in individual corresponding spark plug cells comprising a hollow pneumatic transfer line and opposed first and second pneumatic vacuum pumps disposed in the line and controlled first to propel an insulator and electrode assembly at high speed toward the downstream end of the line and then to decelerate the assembly such that the latter exits the downstream end by substantially the force of gravity. A placement hand receives successive assemblies from the transport line and is operative first to center a corresponding shell beneath the assembly and then to drop the assembly into the shell for swaging at a later work station.

23 Claims, 6 Drawing Figures

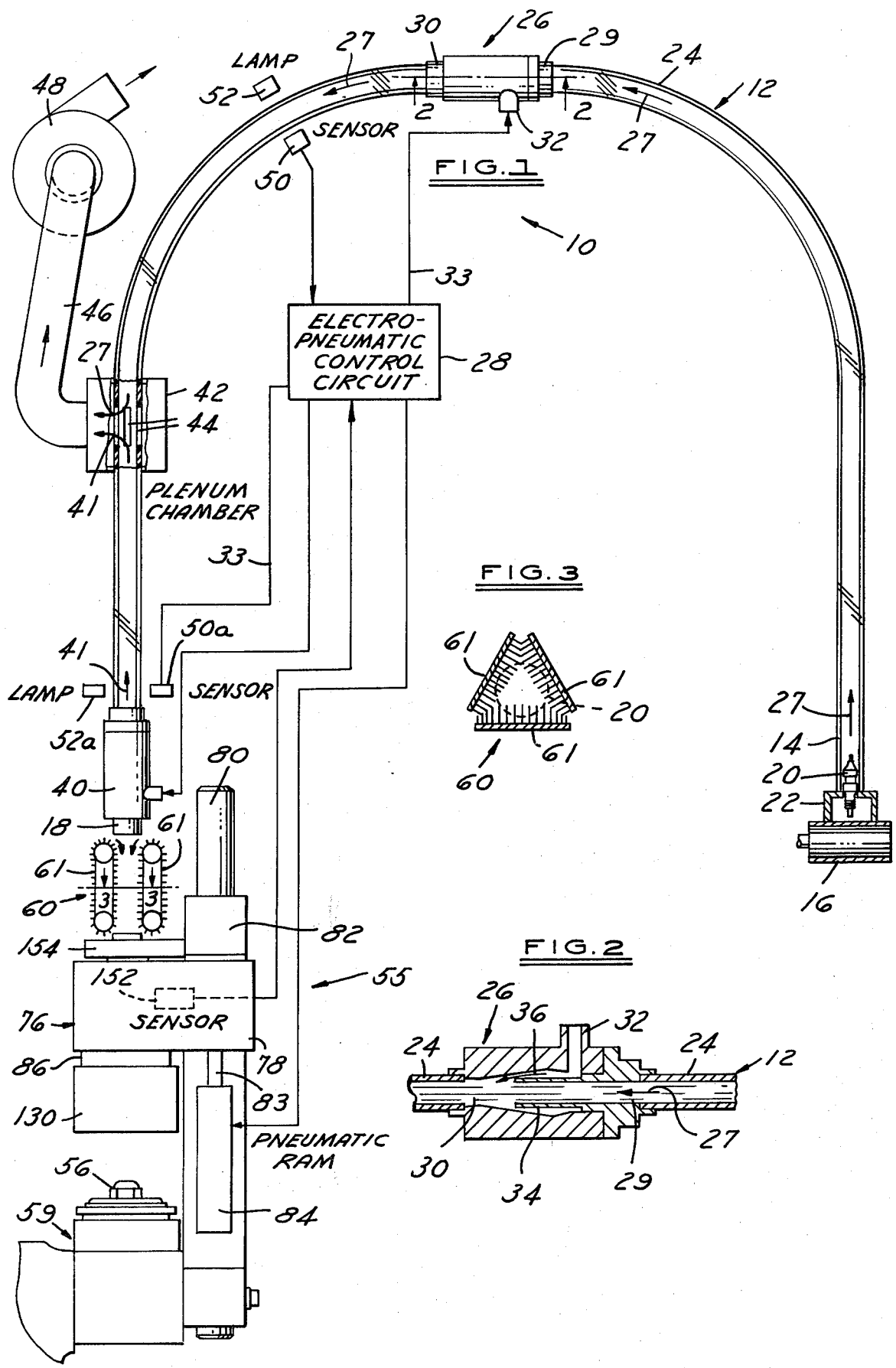

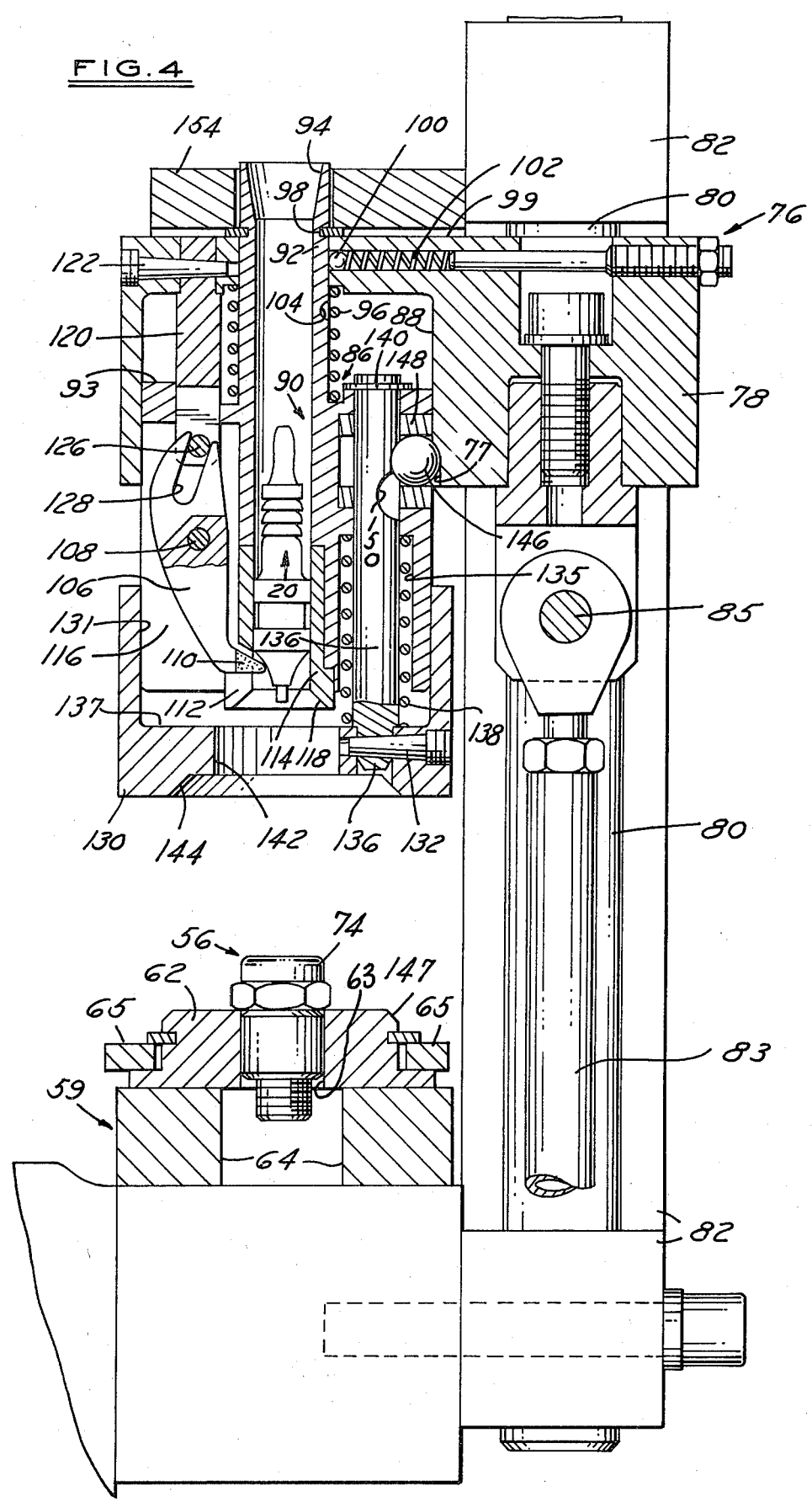

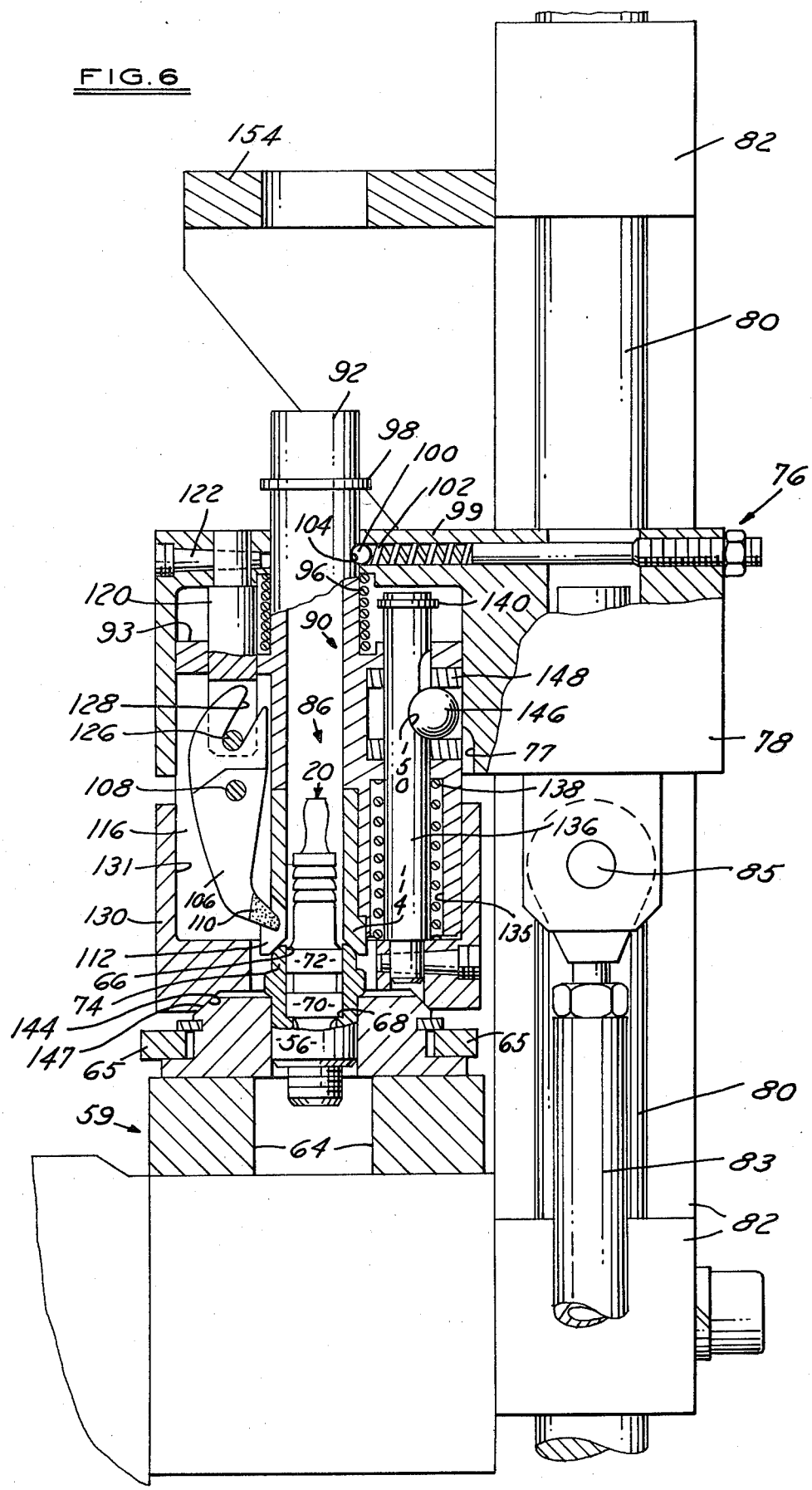

SPARK PLUG CONVEYOR AND ASSEMBLING MEANS

The present invention is directed to pneumatic conveyors, and more particularly to conveyors for transporting fragile parts at high speed. Yet more specifically, the present invention is directed to automated pneumatic apparatus for transporting a series of spark plug insulator and electrode assemblies between work stations and then placing the assemblies into individual corresponding spark plug shells.

An object of the present invention is to provide a pneumatic conveyor which is fully automated, which is adapted to transfer parts at high speed, and yet which is well adapted for use with fragile parts such as spark plug insulator and electrode assemblies.

Another object of the invention is to provide automated apparatus for receiving a part such as a spark plug insulator and electrode assembly from a pneumatic transfer line and then accurately and automatically placing the assembly into a corresponding spark plug shell.

A further object of the invention is to provide pneumatic transfer and placement apparatus for transporting a plurality of successive spark plug insulator and electrode assemblies from one work station or line, and then accurately placing such assemblies in corresponding shells at a remote second work station or line.

The invention, together with additional objects, features and advantages thereof, will be best understood from the following description, the appended claims and the accompanying drawings, in which:

FIG. 1 is an elevational partially schematic view of a presently preferred embodiment of the pneumatic transfer and placement system in accordance with the invention;

FIG. 2 is a sectional schematic view of a vacuum pump taken along line 2—2 of FIG. 1;

FIG. 3 is a sectional view taken along the line 3—3 of FIG. 1;

FIG. 4 is an enlarged partially sectioned elevational view of the placement hand illustrated in FIG. 1 at a first stage of operation; and FIGS. 5 and 6 are partially sectional views similar to that of FIG. 4 showing the placement hand at respective second and third stages of operation.

Figure 5:
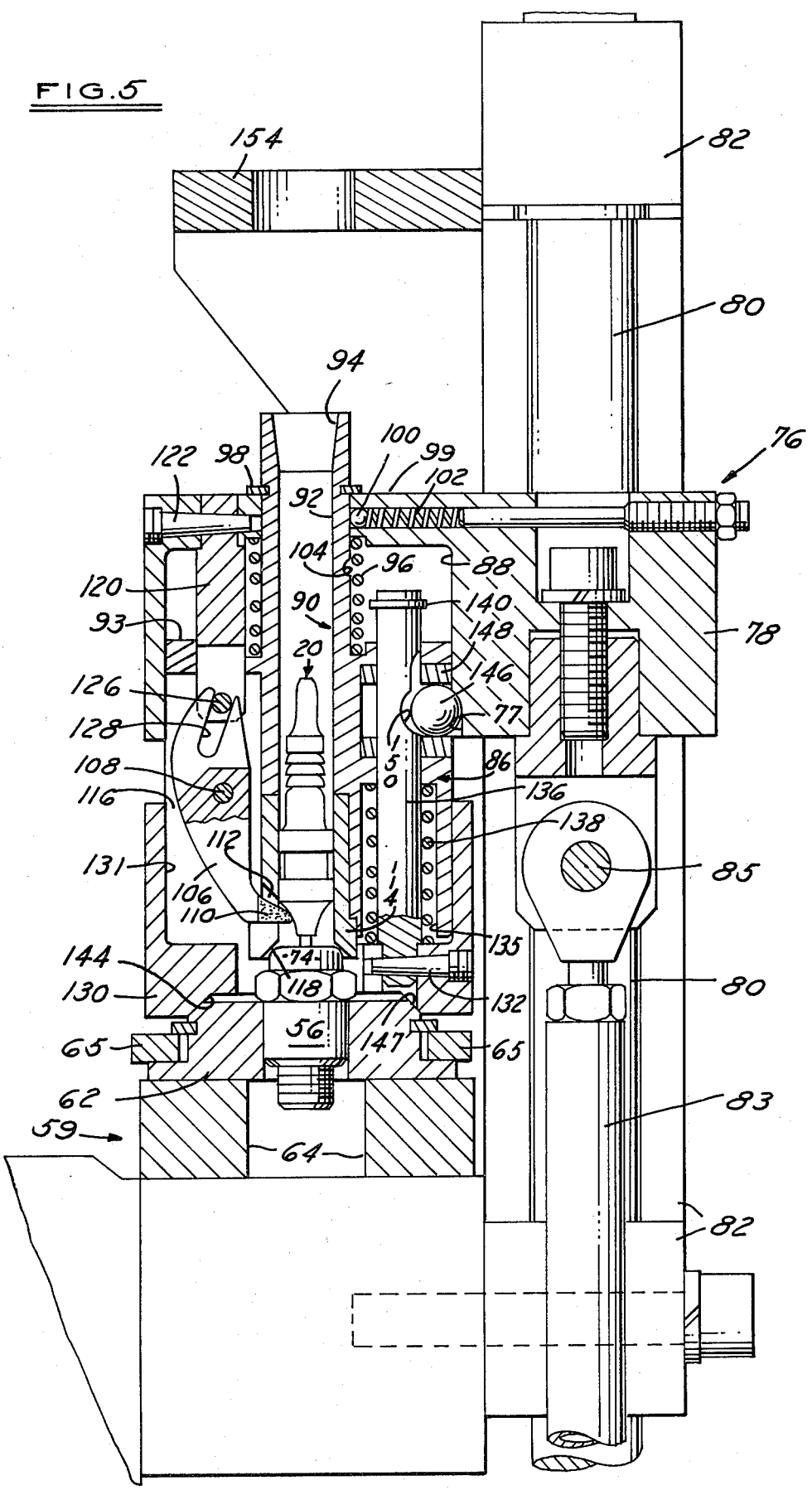

Referring to FIG. 1, a presently preferred embodiment 10 of the pneumatic transfer and placement apparatus provided by the present invention is illustrated as comprising a hollow pneumatic transfer line 12 in the form of a transparent plastic tube extending from an upstream end 14 adjacent a first work station 16 to a downstream end 18. Line 12 is preferably of inverted U-shape. At station 16, a plurality of parts such as spark plug insulator and electrode assemblies 20 are preferably carried as by a tray 22 for successive indexing beneath the upstream end 14 of the transfer line. In the illustrated embodiment for transferring spark plug insulator electrode assemblies, the central arcuate portion 24 of line 12 preferably extends overhead with the ends 14,18 opening in the vertical direction. The inside diameter of tube 12 is preferably sufficient to provide a clearance on the order of 1/16 inch around the part 20.

A first pneumatic vacuum pump 26 is located in central line portion 24 between line ends 14,18 and is oriented to generate a first high velocity air stream in line 12 in the direction 27 under command of an electropneumatic control circuit 28 to lift a part 20 from work station 16 after the part has been positioned beneath upstream line end 14, and to propel the part at high speed toward downstream line end 18. Vacuum pump 26 is illustrated schematically in FIG. 2 and comprises a vacuum inlet port 29 and an exhaust outlet port 30 coupled to line central portion 24 facing upstream end 14 and downstream end 18 respectively. A compressed air supply inlet portion 32 is coupled to control circuit 28 by conduit 33. The central portion or body of pump 26 comprises an annular venturi section 34 which is contoured to cooperate with compressed air entering inlet port 32 in the direction illustrated at 36 for generating the first high velocity air stream in direction 27 from vacuum inlet 29 to exhaust outlet 30. A part propelled by this air stream will pass through transfer line 12 and venturi section 34 toward line downstream end 18 (FIG. 1). An optical sensor 50 is disposed externally of an optical window in line 12 adjacent pump 26 and cooperates with a lamp 52 diametrically across the transfer line for providing an indication to control circuit 28 of passage of a part 20 past the sensor.

A second vacuum pump 40, which may be identical to pump 26, is disposed in line 12 at downstream end 18 and is similarly controlled by compressed air supplied through circuit 28 to generate a second high velocity air stream in the direction 41 opposed to the first stream generated by pump 26 to decelerate a part 20 as the latter approaches line end 18. A second sensor/pump combination 50a,52a may be located at pump 40 and connected to control circuit 28. Control circuit 28 may then be made to automatically control the air pressure and energization times of pumps 26, 40 to achieve a desired time between sensors 50,50a. Pumps 26,40 may be of any conventional type, such as those marketed by Air-Vac Engineering Company of Milford, Connecticut under the trademark "BAZOOKA". A plenum chamber 42 surrounds and encloses a section of transfer line 12 between pumps 26,40 that is formed with a plurality of exhaust slots 44 for exhausting the high velocity of air streams from the respective pumps to atmosphere. Preferably, plenum chamber 42 is connected by a duct 46 to a centrifugal blower 48 or the like for creating a negative pressure in the plenum chamber to promote exhausting of the respective high velocity air streams.

In operation of the invention as thus far described, a part 20 is first brought into vertical registry with the open downstream end 14 of transfer line 12 by suitable indexing means (not shown). Pump 26 is then energized by circuit 28 to lift part 20 into the transfer tube and propel the part at high speed toward downstream end 18 in the direction 27. When the part passes sensor 50, pump 26 is deenergized by stopping the flow of compressed air to its port 32 and pump 40 is energized to produce an opposing high velocity air stream in the direction 41 for decelerating the part as the latter approaches the downstream tube end. The pressure of compressed air and the actuation times of pumps 26,40, as well as the delayed time between operation of sensor 50 and actuation of pump 40, are preferably variable in control circuit 28 and may be adjusted such that the part is caused to approach substantially zero velocity when it reaches the downstream line end 18 and thereafter drop out of the transfer tube at low speed under force of gravity when pump 40 is de-energized. Energization and delayed times, etc. will depend upon the length of the transfer line and the weight of the part, among other factors. Transfer speeds for spark plug insulator and electrode assemblies of the type illustrated at 20 on the order of ten to twenty feet per second are attainable. It is considered preferable to have only one part 20 within the transfer tube at any one time.

The present invention further comprises a device 55 (FIG. 1) for receiving a spark plug insulator and electrode assembly 20 as the latter drops from downstream tube end 18 and placing each assembly 20 into a corresponding spark plug shell 56 carried into vertical registry with tube end 18 by a conventional conveyor 59 described in somewhat greater detail hereinafter. Receiving and locating device 55 includes a brush conveyor 60 disposed immediately beneath transfer tube end 18 for arresting and capturing a part 20 as the latter drops from the tube end. Conveyor 60 includes three bristled endless conveyor belts 61, best seen in FIG. 3, which are driven at a constant speed and disposed in a uniform vertical array 120° apart around the tube outlet substantially coaxially therewith. Conveyor belts 61 are confluent adjacent tube end 18 such that a part exiting the tube end is captured by the overlapping bristles as illustrated in phantom at 20 in FIG. 3 and carried downwardly at fixed speed. The overlapping bristles of conveyor 60 also serve the function of arresting parts exiting the tube end at higher speed than desired due to improper adjustment or malfunction of one of the pumps 26, 40 or of control circuit 28. The soft conveyor bristles, which may be of nylon or the like, cushion the shock on the spark plug insulator and electrode assembly and therefore avoid damage to the fragile part.

Referring to FIGS. 4 through 6, conveyor 59 comprises a plurality of nests 62 each provided with a seat 63 for a spark plug shell 56. Nests 62 are slideably arranged on ways 64 and held in conveyor links 65. Conveyor links 65 permit slight lateral movement of nests 62. Each shell 56 is formed with a central cylindrical bore 66 in a radially inwardly extending shoulder 68 intermediate its ends. The shank of spark plug insulator and electrode assembly 20 is formed with a pair of spaced annular collars 70, 72 dimensioned to have a close sliding fit with bore 66. When the part 20 is disposed in shell 56 the lower collar 70 seats on shoulder 68 and the upper collar 72 is disposed adjacent, but slightly below, the upper end of the shell so that the lip 74 at the upper end of the shell may be swaged over collar 72 to fixedly connect the part 20 with the shell 56. While it is practical to dimension collars 70, 72 so as to have a close sliding fit within the bore 66 of shell 56, it is impractical to make or operate conveyor 59 so that the conveyor itself will locate the bore of shell 56 in accurate axial alignment with the plug assembly 20. Likewise, it is impractical to form the seats 63 in all of the nests 62 so as to have an extremely close fit with the outer cylindrical surface of shells 56. In other words, machining the spark plug assemblies 20 and the bore 66 of the shells 56 to close tolerances is readily feasible, but maintaining such close dimensional tolerances on the conveyor 59 is not feasible. Accordingly, in the present invention the positioning of shell 56 on the conveyor 59 so that its bore is accurately coaxially aligned with the spark plug assembly 20 is achieved by means of the receiving and locating device 55.

The device 55 comprises a placement hand assembly generally designated 76 in FIG. 1, the details of which are shown in FIGS. 4 through 6. The function of the placement hand assembly 76 is to receive a part 20 from the brush conveyor 60, center the shell 56 coaxially beneath the part and then release the part and permit it to drop into the bore 66 of the shell. The placement hand assembly 76 consists generally of three components; namely, a cross head 78, a placement hand 86 and a nest locator 130. Cross head 78 is guided for vertical movement on a pair of guide rods 80 supported on a bracket 82 fixedly mounted on the frame of conveyor 59. The cross head is vertically reciprocated by the rod 83 of a pneumatic ram 84 (FIG. 1). The upper end of rod 83 is connected to cross head 78 as at 85. The operation of ram 84 is controlled by a valve (not shown) connected to control circuit 28.

The placement hand 86 is shaped as a cylindrical member which is vertically slideable in a downwardly opening bore 88 in a cross head 78. Placement hand 86 has a central barrel 90, the bore of which is sized in diameter to receive the part 20 with a close sliding fit. The upper end of barrel 90 is defined by a sleeve 92 projecting upwardly beyond the upper face 93 of placement hand 86. The lower end of barrel 90 is in the form of a hardened steel sleeve 114 pressed into the lower end of placement hand 86. At its upper end, sleeve 92 is formed with an outwardly flared opening or mouth 94 for receiving the parts 20 from the brush conveyor 60. At its lower end sleeve 114 is formed with an outwardly and downwardly flared opening or mouth 118 adapted to engage the lip 74 on shell 56 for accurately locating the shell as described in greater detail hereinafter.

Placement hand 86 is biased downwardly in bore 88 by a compression spring 96 acting between the upper end of bore 88 and the top face 93 of the placement hand. The downwardmost position of placement hand 86 within bore 88 is determined by the abutment of a retainer ring 98 around sleeve 92 with the top face 99 of cross head 78. This position of placement hand 86 relative to cross head 78 is illustrated in FIGS. 4 and 5. A ball detent 100 in cross head 78 is biased by a spring 102 against the outer surface of sleeve 92. When placement hand 86 is shifted vertically upwardly in bore 88 to the position illustrated in FIG. 6, ball detent 100 engages a notch 104 in the outer surface of sleeve 92 to releasably lock the placement hand in its raised position relative to the cross head.

Placement hand 86 is formed with three axially extending slots 116 radiating outwardly from around barrel 90 in which three fingers 106 are pivotally supported on pins 108 for rocking movement. Each finger has a hookshaped tip 110 at its lower end which, in the position illustrated in FIG. 4, extends into the bore of barrel 90 through a slot 112 in sleeve 114. Finger tip 110 is preferably formed of rubber or the like and cushions the shock on part 20 when its downward movement in barrel 90 is arrested by the finger tip as illustrated in FIG. 4. At its upper end, each finger 106 is formed with an inclined cam slot 128 which engages a pin 126 at the lower end of an actuator stud 120. The three studs 120 are fixedly supported on cross head 78 as by taper pins 122. It will be apparent that fingers 106 pivot about their support pins 108 in response to relative vertical movement between placement hand 86 and cross head 78. In the lowered position of the placement hand within bore 88, fingers 106 assume the position illustrated in FIG. 4 wherein the finger tips 110 are in the part holding position, and when the placement hand 86 is in the raised position within bore 88 as shown in FIG. 6, the finger tips 110 are retracted to the part releasing position.

The nest locator 130 has an upwardly opening bore 131 by means of which the nest is supported for vertical sliding movement on the lower end of the cylindrical placement hand 86. Nest locator 130 and placement hand 86 are interconnected by three vertically extending guide pins 136 which are mounted on locator 130 as by taper pins 132. Guide pins 136 are preferably spaced equally apart circumferentially around barrel 90. The nest locator 130 is biased downwardly relative to placement hand 86 by compression springs 138 extending around each of the guide pins 136 and acting between the upper end of downwardly opening sockets 135 in placement hand 86 and a stop face 137 at the lower end of bore 131. The lowermost position of nest locator 130 relative to placement hand 86 is determined by the abutment of retainer rings 140 at the upper end of each guide pin 136 with the top face 93 of placement hand 86. This position of nest locator 130 relative to placement hand 86 is illustrated in FIG. 4.

Placement hand 86 is prevented from moving relative to cross head 78 by means of ball detents 146 until nest locator 130 has completed its full upward travel relative to placement hand 86. Ball detents 146 are retained in radially extending sleeves 148 through which the upper ends of guide pins 136 extend. In the lowered position of nest locator 130 ball detents 146 are trapped radially between guide pins 136 and slots 77 formed at the lower end of bore 88. In the raised position of nest locator 130 (FIG. 6) ball detents 146 are trapped between the cylindrical wall of bore 88 and a notch 150 in each guide pin. Nest locator 130 is formed with a central through bore 142 which terminates at the lower face of the locator in a downwardly and outwardly flared mouth 144 adapted to engage a beveled annular shoulder 147 on the nest 62 to center the nest coaxially with barrel 90. An optical sensor 152 (FIG. 1) is preferably mounted within placement hand 86 to sense the entry of a part 20 into barrel 90 and to communicate the presence of such part to the control circuit 28.

In operation cross head 78, placement hand 86 and nest locator 130 are in the position illustrated in FIG. 4 when a part 20 reaches the brush conveyor 60. Brush conveyor 60 directs a part 20 downwardly into the upper end of the barrel 90 which, at this time, is located adjacent and directly below the lower end of the brush conveyor. The part drops into the barrel and is captured in the position illustrated in FIG. 4 by the hooked finger tips 110. Sensor 152 signals control circuit 28 that a part is ready to be deposited into a shell 56 located therebelow in a nest 62. When nest 62 is in position under placement hand 86, control circuit 28 actuates the valve which operates ram 84 to shift cross head 78 and the components mounted thereon downwardly. At this time nest locator 130 and placement hand 86 are biased downwardly to the positions illustrated in FIG. 4 by springs 138,96 respectively. After the cross head has been moved downwardly a predetermined extent, nest locator 130 engages and centers nest 62 relative to barrel 90. Downward movement of locator 130 is thus arrested by its engagement with nest 62. However, cross head 78 continues to move downwardly to compress springs 138 and thus shift ball detents 146 downwardly along guide rods 136. When ball detents 146 register radially with the enlarged notches 150 on guide rods 136, the ball detents are displaced radially inwardly by the rounded upper ends of grooves 77 and thus permit the cross head 78 to move downwardly relative to the placement hand 86. This occurs when the mouth 118 of sleeve 114 engages the lip 74 of shell 56 to thereby align the shell coaxially with barrel 90. This intermediate position of the assembly is illustrated in FIG. 5.

Continued downward movement of cross head 78 relative to placement hand 86 then causes pins 126 on actuator studs 120 to pivot the fingers 106 such as to retract their hooked ends 110 from within barrel 90. The part 20 is thus released and permitted to drop into the coaxially aligned shell 56 as shown in FIG. 6. It will be noted that as the cross head 78 moves downwardly to pivot fingers 106 to the part release position, ball detent 100 on cross head 78 moves into radial registration with the notch 104 on barrel sleeve 92 to releasably lock placement hand 86 in a raised position relative to the cross head. At the same time, the nest locator 130 is releasably locked in the raised position relative to placement hand 86 by ball detents 146.

When cross head 78 assumes its lowermost position illustrated in FIG. 6, the valve which controls ram 84 reverses the fluid flow to the ram and causes the rod 83 to extend and thus raise the cross head. Since the placement hand and the nest locator are releasably locked to the cross head, the entire placement hand assembly 76 moves vertically upwardly in the condition shown in FIG. 6 with the finger tips 110 retracted out of the bore of barrel 90 to clear part 20 as the assembly is shifted upwardly. When retainer ring 98 on barrel sleeve 92 abuts against the lower face of a stop plate 154 fixedly mounted on support bracket 82, upward movement of placement hand 86 is arrested while the cross head continues to move upwardly. Thus, ball detent 100 is disengaged from notch 104 and placement hand 86 shifts downwardly relative to the cross head under the bias of spring 96 to pivot fingers 106 back to the part stopping position shown in FIGS. 4 and 5. However, shortly after placement hand 86 starts moving downwardly relative to cross head 78 ball detents 146 register radially with the slots 77 in the bore of the cross head allowing the balls to shift radially out of engagement with notches 150 in guide rods 136. Springs 138 thereafter bias the nest locator downwardly and the components of the placement hand assembly 76 again assume the positions illustrated in FIG. 4 where the placement hand is ready to receive the next part discharged from the brush conveyor 60.

It will be appreciated that preferably a plurality of fingers 106 and a plurality of guide rods 136 with the ball detents 146 are employed for maximum efficiency and stability. Where space limitations are severe, a single finger and a single guide rod 136 may be utilized. It will be also appreciated that, although the invention has been described in connection with a presently preferred embodiment thereof, many alternatives and modifications will be readily apparent to persons skilled in the art. For example, in some applications brush conveyor assembly 60 (FIGS. 1 and 3) may be eliminated and parts exiting tube end 18 fed directly to placement hand assembly 76, or even directly to a waiting shell 56. However, use of brush conveyor 60 is preferred for reasons of back-up safety as hereinabove described. Furthermore, the combination of conveyor 60 and placement hand assembly 76 is particularly advantageous in connection with fragile parts such as spark plug insulator and electrode assemblies as described. In some applications it may be possible to eliminate the function of nest locator 130 (FIGS. 4–6) and permit shell 56 to be centered beneath barrel 90 merely by the action of sleeve mouth 118. However, because of the close tolerances necessary between the collars 70,72

(FIG. 6) and the shell bore 66 as hereinabove described, separate coarse and fine centering of the shell as provided by locator 130 and sleeve mouth 118 respectively is preferred.

I claim:

1. A pneumatic conveyor adapted for transferring fragile parts at high speed comprising a hollow pneumatic transfer line having an upstream end adapted to receive parts to be transferred and a downstream end from which the parts are discharged, first pneumatic vacuum pump means disposed in said line between said ends for generating a first high velocity air stream in said line to propel a part from said upstream end toward said downstream end, second pneumatic vacuum pump means disposed in said line adjacent said downstream end for generating a second high velocity air stream in said line in opposition to said first stream to decelerate a part approaching said downstream end, and means connected to said line between said first and second pump means for exhausting said first and second air streams from said line.

2. The pneumatic conveyor set forth in claim 1 wherein said line is of generally inverted U-shape, said upstream and downstream ends opening vertically downwardly.

3. The pneumatic conveyor set forth in claim 2 wherein said first pump means is located generally adjacent the highest point of the inverted U.

4. The pneumatic conveyor set forth in claim 1 further comprising control means for actuating said first and second pump means in succession such that a part transferred at high speed from said upstream end exits said downstream end at low speed.

5. The pneumatic conveyor set forth in claim 4 wherein the downstream end portion of said transfer line opens vertically downwardly, said control means actuating said first and second pump means such that a part exits said downstream end substantially under force of gravity.

6. The pneumatic conveyor set forth in claim 5 wherein said control means includes sensor means disposed to detect passage of a part past a given location in said line and means responsive to said sensor means to deactuate said first pump means and to actuate said second pump means.

7. The pneumatic conveyor set forth in claim 6 wherein said line includes an optical window, and wherein said sensor means comprises an optical sensor adjacent said window.

8. The pneumatic conveyor set forth in claim 5 further comprising means disposed beneath said downstream line end for arresting and capturing a part as the latter drops from said downstream end.

9. The pneumatic conveyor set forth in claim 8 adapted for transferring spark plug insulator and electrode assemblies wherein said arresting and capturing means comprises vertically extending opposed conveyor means confluent adjacent said downstream line end.

10. The pneumatic conveyor set forth in claim 9 wherein said conveyor means comprises a plurality of constant speed endless belt conveyors having resilient part engaging surfaces and disposed in a uniform array around said downstream end substantially coaxially therewith.

11. A pneumatic conveyor comprising a hollow pneumatic transfer line, first and second pneumatic vacuum pump means disposed in opposed relation and exhausting toward each other in said line, means for exhausting the portion of the line extending between said first and second pump means, and control means coupled to said first and second pump means for first actuating said first pump means to propel a part at high speed from an upstream end of said line toward the downstream end of said line and then actuating said second pump means as said part approaches said downstream end to decelerate the part such that the part exits said downstream end at low speed.

12. The pneumatic conveyor set forth in claim 9 or 11 adapted for transferring spark plug insulator and electrode assemblies in combination with means disposed adjacent said downstream end for receiving and placing each said assembly in a corresponding spark plug shell.

13. The pneumatic combination as set forth in claim 12 wherein successive shells are indexed by conveyor means for location beneath said receiving and placing means, said receiving and placing means comprising locator means for centering a shell and a placement hand for releasing an electrode and insulator assembly when the corresponding shell is centered beneath the assembly.

14. The combination set forth in claim 13 wherein said placement hand comprises a vertical barrel having an upper end adapted to receive an electrode and insulator assembly, a pivotal finger movable into said barrel to capture a said assembly in said barrel and means for lowering said placement hand over a shell, said locator means including an outwardly flared lower end of said barrel adapted to engage and center a said shell coaxially with said barrel, said lowering means including means to move said finger out of said barrel when a said shell is centered therebelow such that the electrode and insulator assembly may drop into the shell.

15. The combination set forth in claim 13 wherein each shell is carried by a shell nest on the conveyor means and wherein said receiving and placing means includes means for centering each successive nest beneath said barrel.

16. Apparatus for locating and placing a series of spark plug insulator and electrode assemblies in individual corresponding spark plug shells as the latter are successively positioned beneath said apparatus, said apparatus comprising a placement hand including a vertical barrel having an upper end adapted to receive an insulator and electrode assembly, a movable finger on said hand having a finger tip extending into said barrel to capture the assembly in said barrel, locator means for centering a shell beneath said barrel coaxially therewith, and means for lowering said placement hand and said locator means over a shell when the latter is positioned beneath said apparatus, said lowering means including means to move said finger tip out of said barrel when the shell is centered therebelow such that the insulator and electrode assembly may drop into the centered shell by force of gravity.

17. Apparatus as set forth in claim 16 wherein the spark plug shells are carried by individual nest members on a conveyor line for individual positioning laterally of the shell axis, said locator means including a first locator carried by said placement hand and adapted to engage a nest member as said placement hand is lowered over a shell to center the nest member beneath said barrel.

18. Apparatus as set forth in claim 17 wherein said first locator is carried by said placement hand for axial reciprocation with respect thereto between a first position spaced beneath the lower end of said barrel and a second position wherein said lower end of said barrel is telescopically received in said first locator and wherein said apparatus further comprises spring means for normally biasing said first locator to said first position such that said first locator centers said nest member beneath said barrel upon initial actuation of said lowering means, said barrel being thereafter telescopically received in said first locator immediately above the shell upon continued actuation of said lowering means.

19. Apparatus as set forth in claim 16 or 17 wherein said locator means comprises an outwardly flared opening at the lower end of said barrel for engaging and centering a shell coaxially with said barrel.

20. Apparatus as set forth in claim 19 wherein said lowering means includes a cross head on which said placement hand is carried for axial reciprocation relative to said cross head, said apparatus further comprising spring means disposed between said placement hand and said cross head such that said placement hand is normally biased downwardly from said cross head and becomes gradually nested within said cross head against the force of said spring means as said cross head is further lowered after said flared opening engages a shell.

21. Apparatus as set forth in claim 20 wherein said means to move said finger comprises an actuator on said cross head for engaging and moving said finger to retract said finger tip during said further lowering of said cross head.

22. Apparatus as set forth in claim 16 in combination with a pneumatic conveyor which includes a hollow pneumatic transfer line, first and second pneumatic vacuum pump means disposed in opposed relation in said line, exhaust means disposed in said line between said first and second pump means, and control means coupled to said first and second pump means for first actuating said first pump means to propel a spark plug insulator and electrode assembly at high speed from an upstream end of said line toward the downstream end of said line and then actuating said second pump means as said assembly approaches said downstream end to decelerate the assembly such that the assembly exits said downstream end at low speed, said placement hand being disposed to receive the assembly as the latter drops from said downstream end.

23. The combination as set forth in claim 22 further comprising means disposed between said downstream line end and said barrel of said placement hand for arresting and capturing a spark plug insulator and electrode assembly as the latter drops from said downstream end, said arresting and capturing means comprising a plurality of opposed bristled conveyor means confluent adjacent said downstream end.

* * * * *